United States Patent [19]

Kretschmer et al.

[11] Patent Number: 4,785,730

[45] Date of Patent: Nov. 22, 1988

[54] NEEDLE-PROTECTING SYSTEM FOR BALER

[75] Inventors: Karl-Heinz Kretschmer, Neustadt; Jürgen Röllich, Ehrenberg; Boto Kritzner, Neustadt; Gerhard Schindler; Egon Vilbrandt, both of Abtshagen; Günter John, Neustadt; Christian Steglich, Grimmen, all of German Democratic Rep.

[73] Assignee: VEB Kombinat Fortschritt Landmaschinen, Neustadt, German Democratic Rep.

[21] Appl. No.: 131,880

[22] Filed: Dec. 11, 1987

[30] Foreign Application Priority Data

Dec. 15, 1986 [DD] German Democratic Rep. ... 297553

[51] Int. Cl.⁴ ............................................. B65B 13/06
[52] U.S. Cl. ................................. 100/19 R; 100/189; 56/343
[58] Field of Search .................. 100/3, 7, 19 R–24, 100/188 R, 189; 56/343

[56] References Cited

U.S. PATENT DOCUMENTS 4,198,904  4/1980  Cheale et al. ..................... 100/19 R

FOREIGN PATENT DOCUMENTS 2647472  5/1977  Fed. Rep. of Germany .... 100/19 R
112066  5/1974  German Democratic Rep. .

Primary Examiner—Peter Feldman
Attorney, Agent, or Firm—Herbert Dubno; Andrew Wilford

[57] ABSTRACT

A baling machine according to the invention has a frame having walls defining an elongated compaction chamber having a front end provided with a transversely open intake to which a stream of crop is fed substantially continuously. At least one compacting member is periodically displaced in the chamber between a front position forward of the intake and a back position rearward of the intake by an appropriate drive so as to rearwardly compact crop in the chamber. A plurality of pushers are each displaceable between an advanced position projecting into the chamber and only partially blocking the intake and a retracted position substantially out of the chamber by a linkage that advances the pushers into their advanced position only when the member is rearward of the intake and of the pushers. Thus advance of the pushers into the advanced position immediately after movement of the compacting member rearward past the pushers parts the stream of crop between the pushers and compacting member. A plurality of tie needles engages across the chamber rearward of the pushers in the advanced position thereof so as to pull respective ties across only when the pushers are in the advanced position. Normally according to the invention each of the pushers is formed with a throughgoing guide hole and each of the needles can pass through a respective one of the holes in the advanced position of the respective pusher.

6 Claims, 4 Drawing Sheets

NEEDLE-PROTECTING SYSTEM FOR BALER

FIELD OF THE INVENTION

The present invention relates to a baling machine. More particularly this invention concerns a system for protecting the needles that pass the tie around the bale in a round-type baler.

BACKGROUND OF THE INVENTION

A baler, particularly of the type producing large cylindrical bales, has a compaction chamber to which a stream of crop is delivered continuously, normally entering via a hole in the upstream end of the floor of the chamber. Compacting organs press together the crop, pushing it downstream from the intake opening, and when the bale is fully formed needles poke crosswise across the path of the strand behind the compactors to pass a tie around the trailing end of the bale.

The typical such press as described in East German patent document No. 112,066 has a reciprocating piston which is formed with a plurality of slots extending in its displacement direction and opening at the face used to push and compress the crop. Once the piston is pushed up against the trailing end of the bale the strand-guiding needles of the tying device move up through these slots to pull the strands, which normally are either wire or string, around this trailing end, whereupon a knotting device can tie them off, that is can cut each strand and tie the cut end with the previously cut end. Operating synchronously with the piston is a cutter which slices through the crop stream at the lateral intake opening just as the piston moves past it, this intake being blocked by the piston during the final compaction/tying operation.

Such a system has the disadvantage that sliding through the crop stream is a relatively difficult operation that puts a relatively large temporary load on the drive for the baler. Thus this drive must be overdimensioned to take up this periodic large load. In addition the complete blockage of movement of the crop for the relatively long period of time it takes to tie up the bale and retract the piston can cause the crop to jam in the passage leading to the intake opening.

The arrangement of West German patent document No. 3,241,490 is a large round-bale machine which compacts the crop with a pair of forks that engage in the crop stream and push it back, and that on their return stroke to the front of the device are pulled laterally out of the crop stream. In this system the tie-guiding needles push up through the relatively loose crop stream in back of the compaction forks. The disadvantage of this arrangement is that pushing the needles through even the relatively loose crop is difficult so that the ties can break. Furthermore the crop in the bale and the crop in the stream still remains somewhat joined past the ties, so that when the bale is ejected it entrains some of this crop and can break the ties and needles.

In another machine proposed in West German utility model No. 7,521,769 the tie needles pass through the crop at the extreme downstream end of the chute at the intake mouth of the baling chamber. Segmental shields block this chute immediately upstream of these needles to protect them as they traverse the chute. Such a device once again demands that the movement of the continuously arriving strand of crop be blocked for enough time to make jamming likely and to interfere with continuously picking a windrow of the crop up off the ground. In addition it is only applicable to large round-type balers that do not have particular compaction elements.

Yet another system is known from West German patent document 2,647,472 where the needles also pass through the crop stream right where it enters the compaction chamber. Here special shield rails are provided to protect the tie needles. Such a system can have blocking combs that, once again, completely block passage of the crop into the compaction chamber, so that jamming of the machine is likely.

OBJECTS OF THE INVENTION

It is therefore an object of the present invention to provide an improved system for protecting the tie needles of a baler.

Another object is the provision of such a system for protecting the tie needles of a baler which overcomes the above-given disadvantages, that is which operates in a machine with compaction forks without substantially stopping the flow of incoming crop and that is not subject to damage by contact of the needles with the crop.

SUMMARY OF THE INVENTION

A baling machine according to the invention has a frame having walls defining an elongated compaction chamber having a front end provided with a transversely open intake to which a stream of crop is fed substantially continuously. At least one compacting member is periodically displaced in the chamber between a front position forward of the intake and a back position rearward of the intake by an appropriate drive so as to rearwardly compact crop in the chamber. A plurality of pushers are each displaceable between an advanced position projecting into the chamber and only partially blocking the intake and a retracted position substantially out of the chamber by a linkage that advances the pushers into their advanced position only when the member is rearward of the intake and of the pushers. Thus advance of the pushers into the advanced position immediately after movement of the compacting member rearward past the pushers parts the stream of crop between the pushers and compacting member. A plurality of tie needles engages across the chamber rearward of the pushers in the advanced position thereof so as to pull respective ties across only when the pushers are in the advanced position. Normally according to the invention each of the pushers is formed with a throughgoing guide hole and each of the needles can pass through a respective one of the holes in the advanced position of the respective pusher.

With the system of this invention, therefore, the stream is pulled apart longitudinally of itself by the rearwardly moving compaction members and the forwardly moving pushers, and the needles are passed through the gap in the stream thus formed. The needles can therefore enter right into the compaction chamber, not simply into the chute, but will meet no resistance from the crop. In addition longitudinally oppositely parting the stream can be done with little expenditure of energy as compared to a cutting operation, and also does not cut small pieces likely to be lost from the crop. The lowermost part of the compaction member is spaced well above the floor of the compaction chamber so that there is no cutting or shearing action at all, instead the crop is gently pulled apart. Finally the partial blocking of the intake mouth is sufficient to part the crop, but still allows crop to enter the compaction chamber forward of the pushers, thereby avoiding the problem of blocking the chute leading from the intake opening in the floor of the compaction chamber to the front-end intake device and choppers of the piece of agricultural equipment.

According to another feature of this invention the linkage includes a plurality of levers pivoted on the frame and operatively engageable by the compacting member and tie rods interconnecting the levers and the pushers. Thus operation of the pushers is synchronous with operation of the compaction member. More particularly according to this invention one of the levers is a two-arm lever having an upper end operably engageable with the member and a lower end connected via one of the tie rods to the pushers and another of the levers also has an upper end operably engageable with the member and connected via another of the tie rods to the one lever. In this arrangement the compaction member strikes the two-arm lever when moving backward and causes its lower end to pivot forward and thereby pull the pushers up into the advanced positions while engagement with the second lever reverse-pivots the first lever and pushes the pushers back. Since the pushers move downward and backward in the crop-travel direction, the natural onward pressure of the crop will effectively return them to their out inactive positions out of the chamber.

It is also within the scope of this invention for the linkage to be a simple link connecting the pushers to the needles. Thus the pushers would advance synchronously only when the needles are advanced. This is in a system where the bale may be compacted several times before it is trussed up, as above, but where the crop is not pulled apart into discreet batches which are compacted together.

The compaction members according to this invention are constituted as forks synchronously movable between a relatively closely spaced position engaged in the chamber and a relatively widely spaced position substantially outside the chamber. The compactor drive moves the forks backward in the close position and forward in the wide position.

DESCRIPTION OF THE DRAWING

The above and other objects, features, and advantages will become more apparent from the following, it being understood that any feature described with reference to one embodiment of the invention can be used where possible with any other embodiment and that reference numerals not specifically mentioned with reference to one figure but identical to those of another refer to structure that is functionally if not structurally identical. In the accompanying drawing.

SPECIFIC DESCRIPTION

Figure 1:
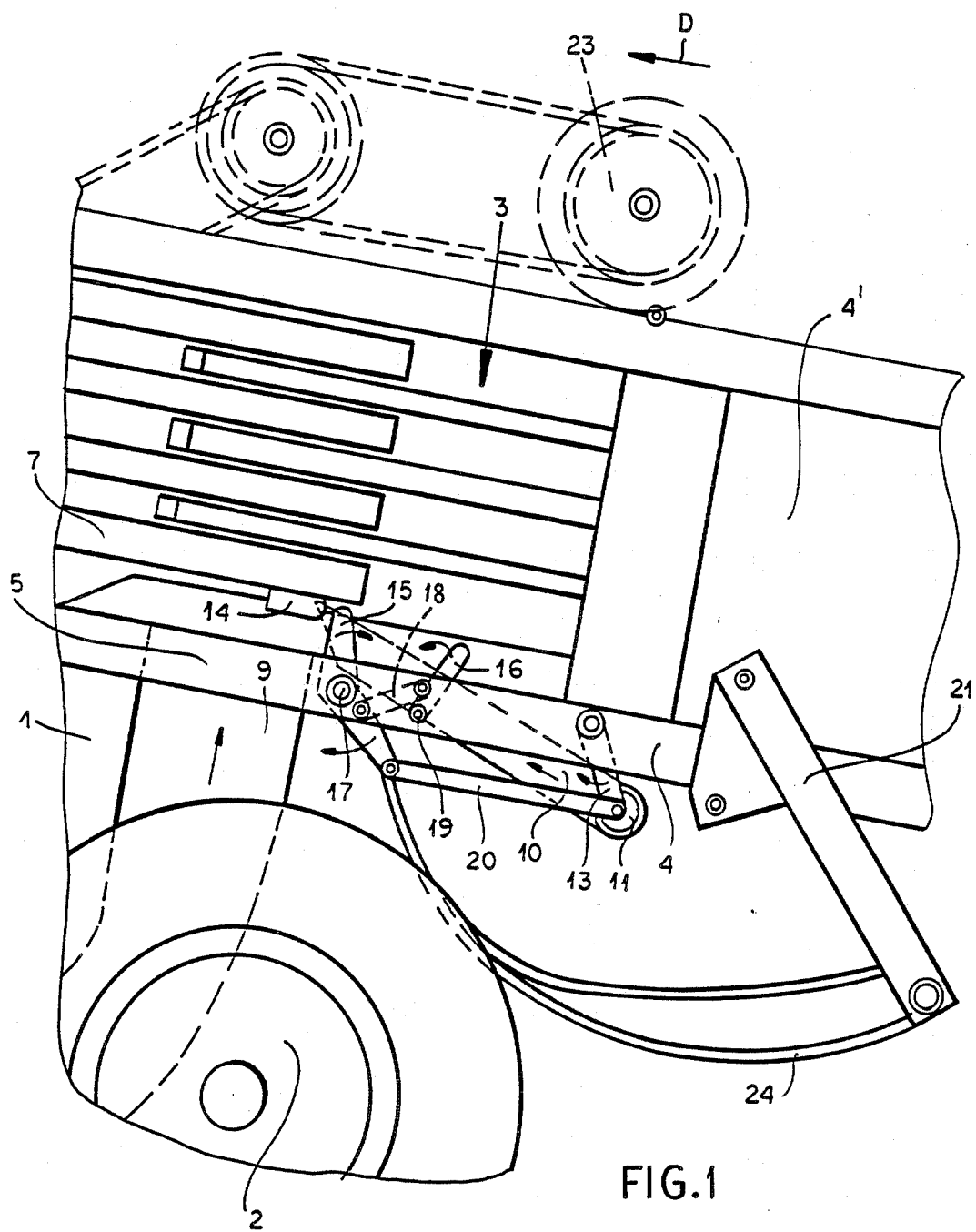
FIG. 1 is a partly schematic side view of the baler according to this invention.
Figure 2:
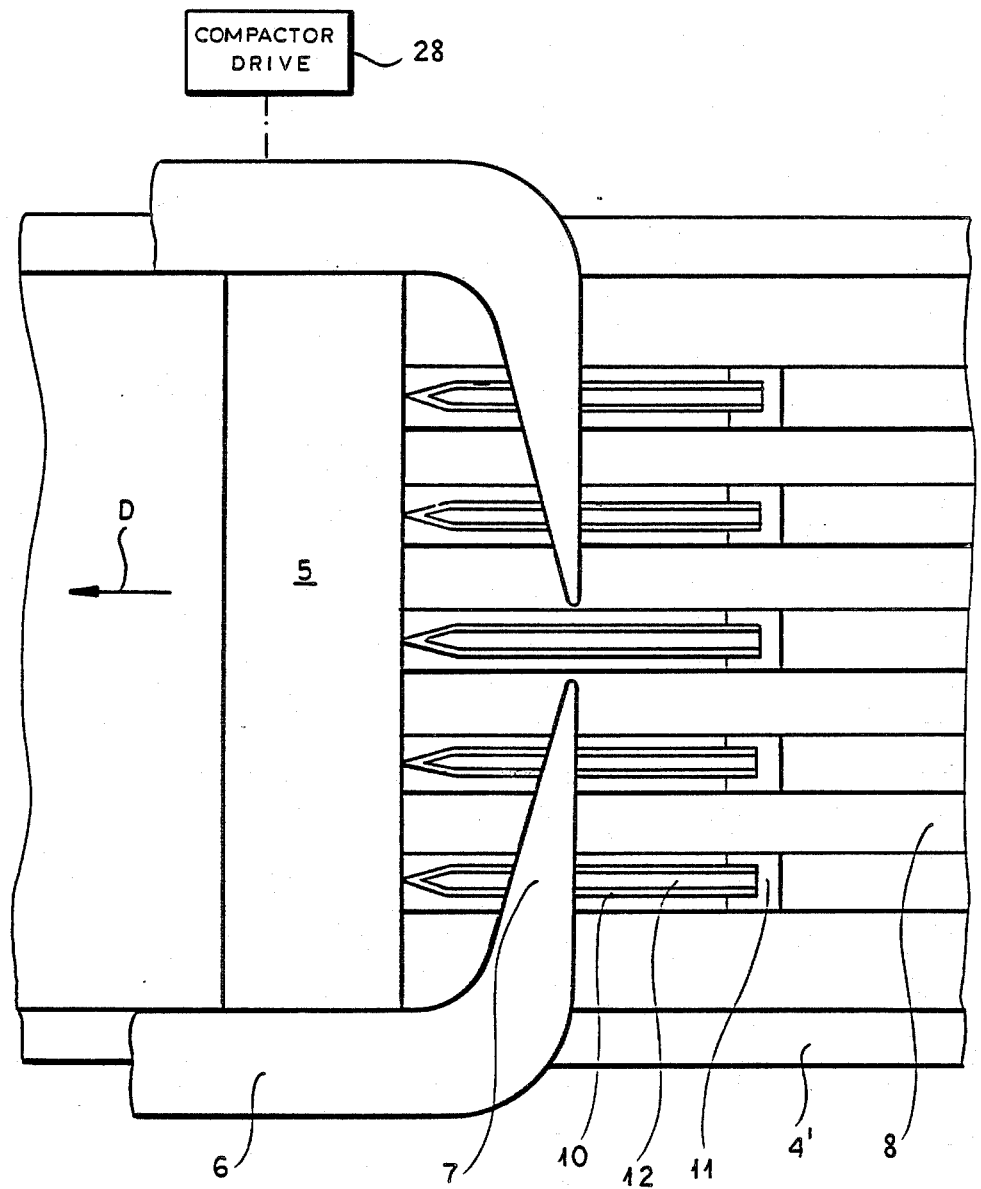
FIG. 2 is a top view of the structure of FIG. 1.

As seen in FIGS. 1 and 2 the round baler according to this invention has a frame 1 adapted to travel via wheels 2 on the ground in a horizontal direction D. The frame 1 has a bottom wall or floor 4 and side walls 4' that define a parallelepipedal baling chamber 3 that receives crop at its front end via a full-width intake opening 5 from a cut-crop feed whose chute is indicated at 9. The chamber 3 is also upwardly closed and is provided at its rear end with a wall that can be moved out of the way to dump out a tied bale in the manner known per se.

Figure 3:
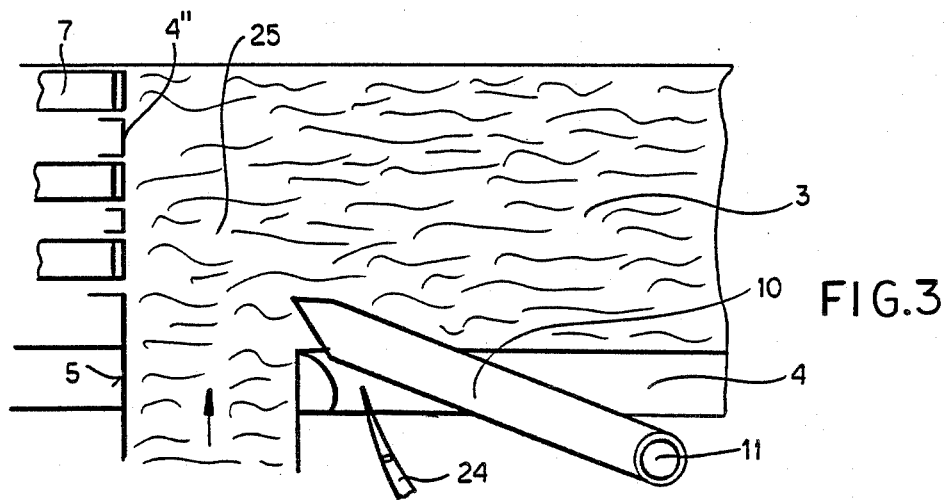
FIGS. 3, 4, and 5 are vertical sections through details of the apparatus in successive stages of a tying operation.
Figure 4:
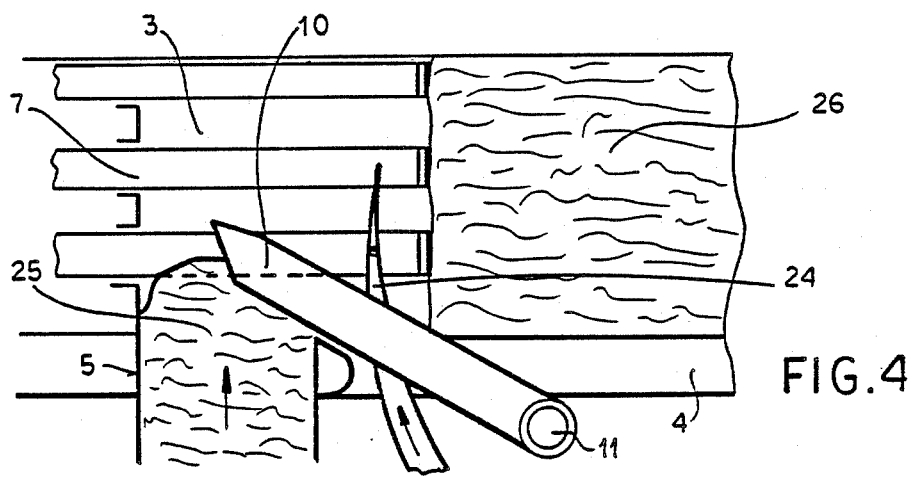
Figure 5:
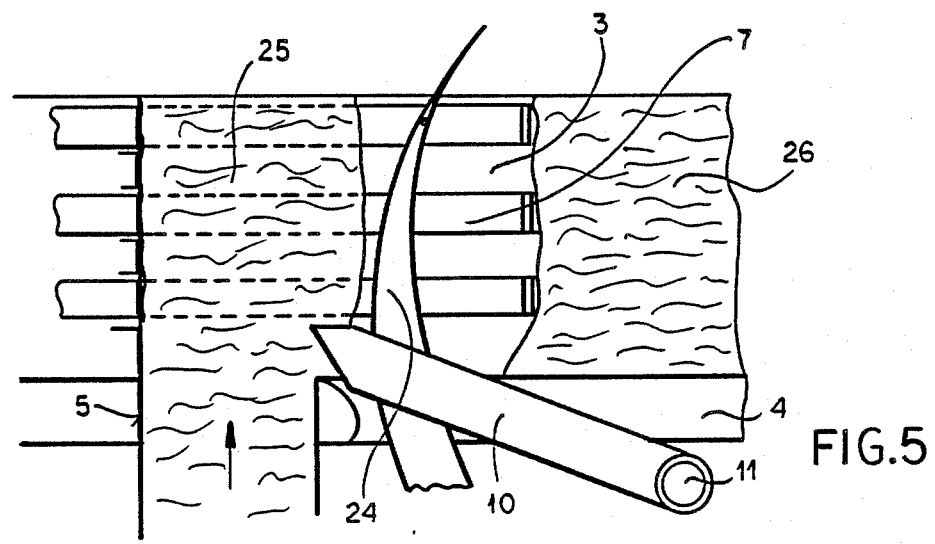

The baler is provided with a pair of compacting forks 6 each having a plurality of pointed arms 7 that can reach in through spaces between bars 8 forming the upstream portions of the walls 4 and 4'. The lowermost space on each side of the chamber 3 is above its floor 4 so that the lowermost arm 7 is at all times spaced well above this floor 4. In use a drive indicated schematically at 28 moves the arms 7 simultaneously toward each other and back opposite the direction D, then apart out of the chamber 3 and forward in the direction D. This compacts as seen in FIGS. 3 through 5 a portion of the crop stream 25 into the rear end of a bale 26, the compaction action taking place at least once during the production of a single bale. When the compaction operation takes place more than once per bale, periodically it is accompanied by a tying operation which fastens a plurality of cords lengthwise around the bale to hold it together, whereupon it is pushed out the back end of the machine.

According to this invention the baler frame 1 carries a plurality of pusher bars 10 that can be pushed upward in the forward direction D into the chamber 3 from immediately behind the rear edge of the upwardly open intake opening 5. These pushers 10 project through the spaces formed between the bars 8 forming the upstream portion of the chamber floor 4 and are displaceable between the rest position shown in FIGS. 1, 2, and 3 in which they are substantially out of the chamber 3 and the advanced position of FIG. 3 in which they project forward into the chamber 3 and partially block the intake opening 5. When fully advanced the tips of the pushers 10 are still spaced horizontally in the direction D in back of the front wall 4''. Appropriate guides are provided in the floor 1 to support and guide these pushers 10.

More particularly, each pusher 10 is welded at its rear end to a support rod 11 extending horizontally perpendicular to the direction D and suspended at its end by a pair of links 13 from the frame 1 so that this rod 11 can oscillate underneath the frame 1 about an axis above and parallel to itself. At least one of the lowermost arms 7 is provided with an abutment 14 that can engage the upper arm of a two-arm lever 15 pivoted on the frame at 17 and having a lower end connected via a tie rod 20 to the support rod 11. In addition a return lever 10 pivoted at 19 on the frame 1 has an upper end engageable by the abutment 14 and is connected via a link 18 to the lower arm of the lever 15.

Each of the pushers 10 is in fact formed as two plates joined at their pointed front ends and forming a vertically throughgoing passage 12 through which a respective tying needle 24 can pass. These needles 24 are all carried on a U-shaped hanger 21 connected via a rod 22 to the drive 23 of the knotting mechanism which is operated synchronously with the compacting fork 6, that is once every nth time the compacting fork 6 operates, n being the number of times the crop is compacted per bale. On the other hand, the pushers 10 lift up and push the crop stream back each time the compacting forks 6 move backward to compact the bale. As a result the bale is formed of a plurality of semidiscrete wads or bunches of crop so that it can easily be broken up to use portions of it as fodder.

The system described above operates as follows:

As shown in FIG. 3 when the rearwardly moving abutment 14 engages the lever 15 it pivots same clockwise as seen in the drawing, pulling its lower arm and the support 11 forward. This advances the pushers 10 into the continuously arriving stream 25 of crop immediately behind the rearwardly moving compactor arms 7, thereby forming a gap in the stream 25. At their furthest advanced position as shown in FIG. 4 the pushers 10 partially block the opening 5 while at the same time allowing incoming crop to pile up at the leading or upstream end of the chamber 3. In this FIG. 4 position the abutment 14 engages the lever 16 and starts the pushers 10 moving back down toward the rear.

When the compactor arms 7 are engaged in their last compaction operation for the bale, the knotter 23 operates and, once the pushers 10 have been advanced enough that the arms 7 have formed the empty space in the crop stream behind the raised pushers 10, the needles 24 are moved up through the holes 12 of the pushers 10 to pull the tie string or wire completely around the bale 26, whereupon of course the knotter 23 known per se ties off the strand.

Figure 6:
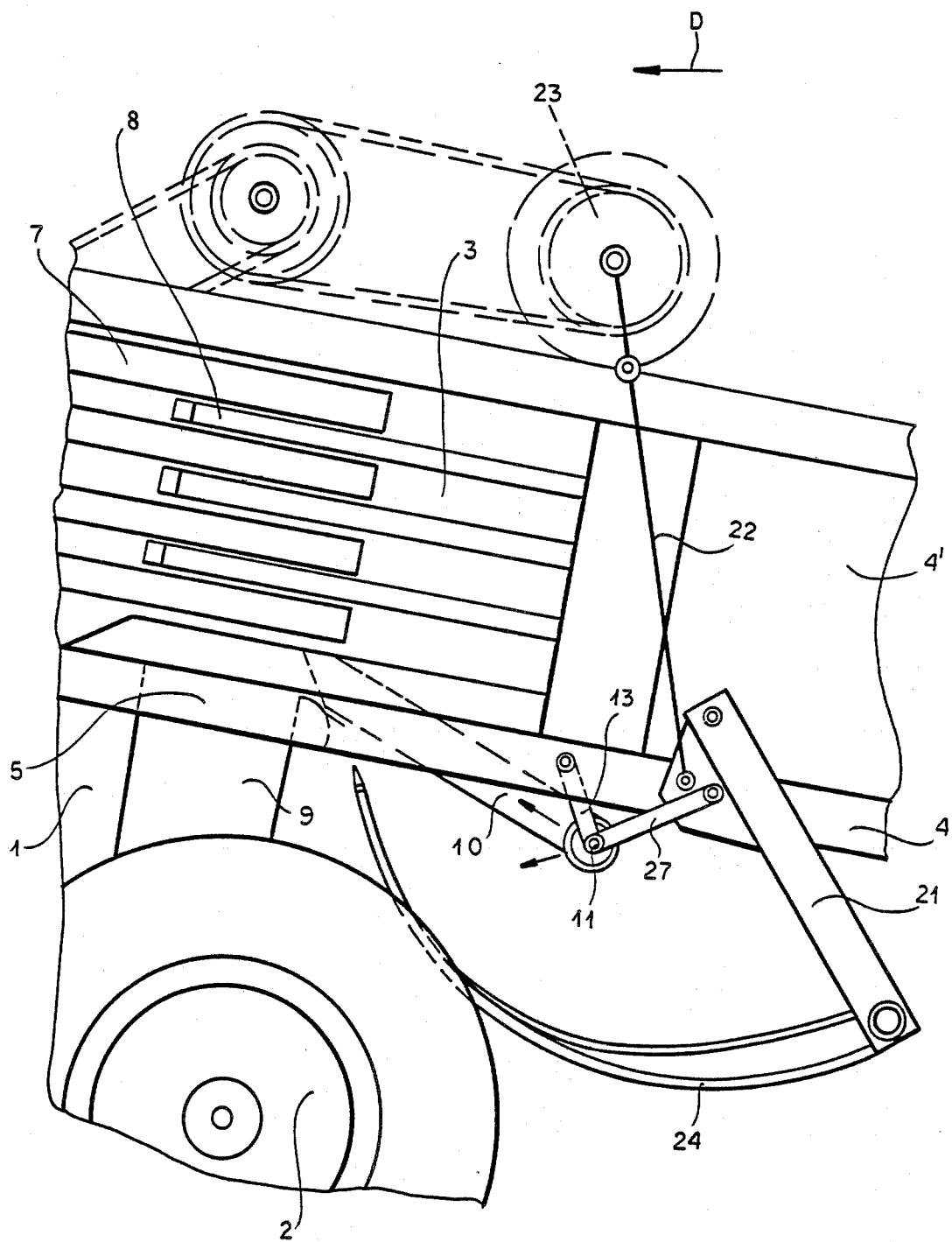
FIG. 6 is a view like FIG. 1 of another embodiment of the system of this invention.

With the system of FIG. 6 the abutment 14, arms 15 and 16, and links 18 and 20 are not used. Instead the support 11 is connected via a tie link 27 to the support 21 for the needles 24. This simplified system only raises the pushers 10 at the end of a bale, when it is being tied up. The pushers 10 are automatically raised slightly ahead of the needles 24.

According to this invention, therefore, the pushers 10 temporarily part the stream of incoming crop for long enough for the needles 24 to pass up through it and pass the tie strand around the bale virtually without any contact with the crop, since even if the crop pokes past the pushers 10 somewhat the needles 24 will lie exactly in their wake and be protected. The interruption is modest and entails no actual cutting of the crop, as instead the oppositely moving pushers 10 and compacting forks 6 just part the crop stream, an operation that consumes little energy and does little damage to the crop. In fact as clearly visible from FIGS. 3 through 5 the incoming crop stream 25 still enters the chamber 3, bunching up mainly upstream of the pushers 10 when they are advanced in the FIG. 4 position. Thus the crop that is coming continuously in from the front-end intake and chopper does not have to stop and is unlikely to jam up in the chute 9.

We claim:

1. A baling machine comprising:
   a frame having walls defining an elongated compaction chamber having a front end provided with a transversely open intake;
   means for feeding a stream of crop substantially continuously through the intake to the compaction chamber;
   at least one compacting member displaceable in the chamber between a front position forward of the intake and a back position rearward of the intake;
   compactor drive means for periodically displacing the member from its front to its rear position and thereby rearwardly compacting crop in the chamber;
   a plurality of pushers each displaceable between an advanced position projecting into the chamber and only partially blocking the intake and a retracted position substantially out of the chamber;
   link means on the frame for advancing the pushers into their advanced position only when the member is rearward of the intake and of the pushers, whereby advance of the pushers into the advance position immediately after movement of the compacting member rearward past the pushers parts the stream of crop between the pushers and compacting member;
   a plurality of tie needles engageable across the chamber rearward of the pushers in the advanced position thereof; and
   needle drive means connected to the needles for advancing same across the chamber and thereby pulling respective ties across only when the pushers are in the advanced position.

2. The baling machine defined in claim 1 wherein there is one such needle for each pusher, each of the pushers is formed with a throughgoing guide hole, and each of the needles can pass through a respective one of the holes in the advanced position of the respective pusher.

3. The baling machine defined in claim 1 wherein the link means is operatively connected between the compacting member and the pushers and includes a plurality of levers pivoted on the frame and operatively engageable by the compacting member and tie rods interconnecting the levers and the pushers.

4. The baling machine defined in claim 3 wherein one of the levers is a two-arm lever having an upper end operably engageable with the member and a lower end connected via one of the tie rods to the pushers, another of the levers also having an upper end operably engageable with the member and being connected via another of the tie rods to the one lever.

5. The baling machine defined in claim 1 wherein the link means includes a link connecting the pushers to the needles.

6. The baling machine defined in claim 1 wherein there are two such compacting members constituted as forks synchronously movable between a relatively closely spaced position engaged in the chamber and a relatively widely spaced position substantially outside the chamber, the compactor drive means moving the forks backward in the close position and forward in the wide position.

* * * * *